United States Patent [19]
Hobbs et al.

[11] 3,762,585
[45] Oct. 2, 1973

[54] ADJUSTABLE SPACER BLOCK SYSTEM FOR USE IN TOWING VEHICLES
[75] Inventors: DeWitt C. Hobbs, Fairland; Robert L. Hauk, Indianapolis, both of Ind.
[73] Assignee: DeWitt C. Hobbs, trustee, Fairland, Ind.
[22] Filed: Aug. 11, 1972
[21] Appl. No.: 279,847

[52] U.S. Cl. .............................. 214/86 A, 280/495
[51] Int. Cl. ............................................. B60p 3/12
[58] Field of Search .................. 214/86 A; 280/495, 280/477

[56] References Cited
UNITED STATES PATENTS
3,398,976  8/1968  Menzl ........................ 214/86 A X
3,610,447  10/1971  Ortiz .............................. 214/86 A Primary Examiner—Albert J. Makay
Attorney—William R. Coffey

[57] ABSTRACT

An appliance for use with a vehicle tow sling comprising a cross beam having two upstanding, adjustable posts proportioned and designed to be moved into lifting engagement with frame members of a vehicle to be towed, without interference with other depending vehicle parts, the beam being provided with guideways for the sling towing chains, and the appliance being proportioned and designed to hold the beam and the chains below the level of other depending vehicle parts to prevent damage thereto when a vehicle is lifted and towed by means of the sling.

5 Claims, 6 Drawing Figures

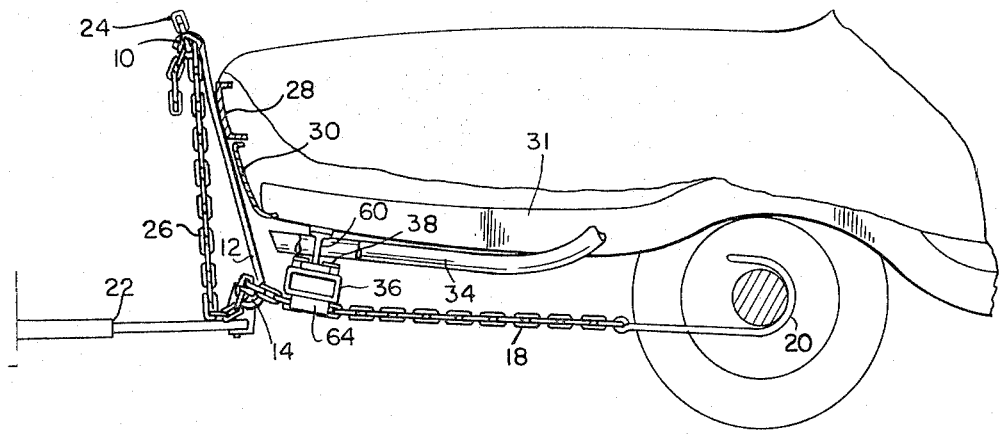
Fig. 3
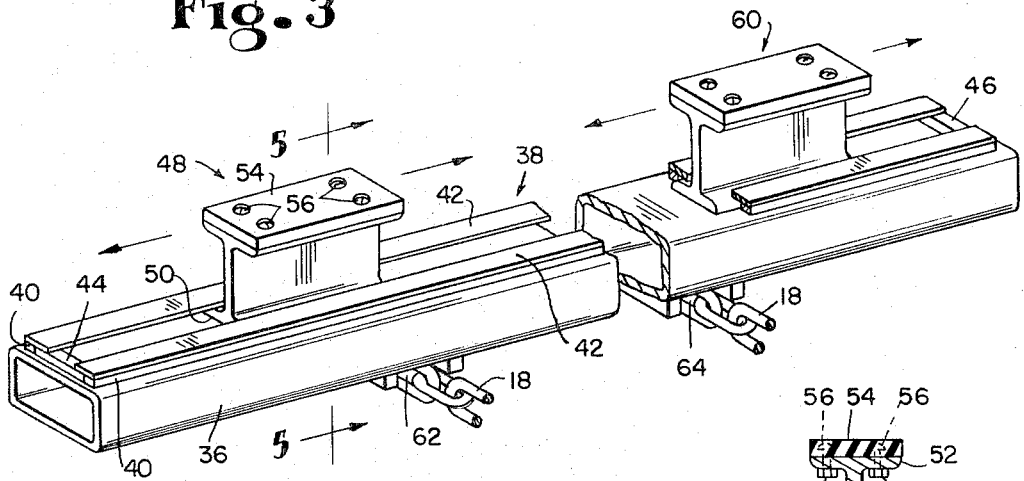
Fig. 4
Fig. 5
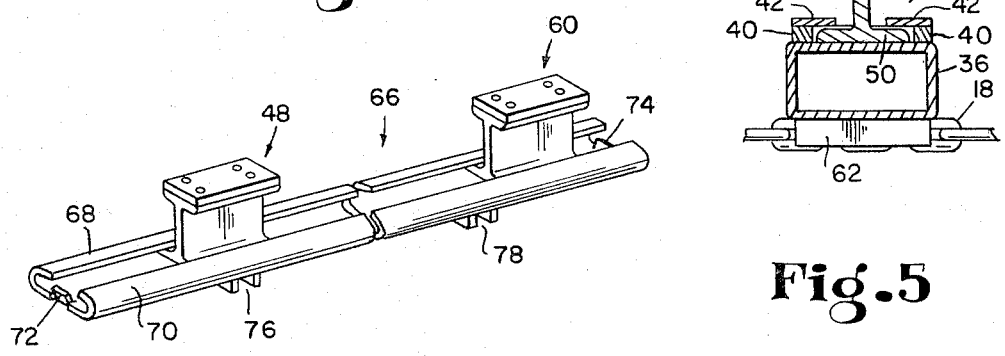
Fig. 6

ADJUSTABLE SPACER BLOCK SYSTEM FOR USE IN TOWING VEHICLES

In recent years, it has become more and more frequently necessary to tow unoccupied automobiles away from the scenes of damage, stalling or improper parking; and what is known as sling-towing has been found to be the most practical mode of moving such vehicles. In sling-towing, one end of the vehicle to be towed is lifted by derrick means on the towing vehicle while the wheels at the opposite end of the vehicle to be towed remain on the ground. An anchor bar is tucked under the leading end of the vehicle to be towed and is connected by chains to suitable points on the chassis while broad, flexible strap means extends upwardly from the anchor bar for connection with the lifting means on the towing vehicle. One popular form of sling-towing device is disclosed in the prior patent to G. E. Holmes, U.S. Pat. No. 2,913,131, issued Nov. 17, 1959. The device therein disclosed tends to prevent the towed vehicle from being damaged by the towing equipment; but it has been found that some of the relatively fragile vehicle parts which are disposed beneath the frame members of some vehicles are, in fact, sometimes damaged during the use of commercial embodiments of such towing devices.

Furthermore, because various makes and models of today's automobiles are not uniform in width, length and the distribution of such relatively fragile parts, it is difficult for a serviceman so to arrange the several parts of the towing device as to avoid damage to various parts of the vehicles to be towed.

The primary object of the present invention, therefore, is to provide an appliance so constructed as to be usable, with any commercial sling-towing equipment, to engage and retain the towing chains in such relation to the frame of a vehicle to be towed as to hold those chains affirmatively out of possible engagement with any vehicle part and to sustain the lifting load upon those chains wholly from the frame members of the vehicle to be towed, the appliance being adjustable so that it is readily insertable between the towing chains and the frame members of the vehicle to be towed.

Further objects of the invention will appear as the description proceeds.

To the accomplishment of the above and related objects, this invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 3 is a fragmentary side elevation of the rear end of an automobile so lifted;

FIG. 4 is a perspective view of our appliance, showing fragments of the towing chains operatively associated therewith;

FIG. 5 is a transverse section taken substantially on the line 5—5 of FIG. 4; and FIG. 6 is a view similar to FIG. 4 but showing a modified form of our appliance.

Figure 1:
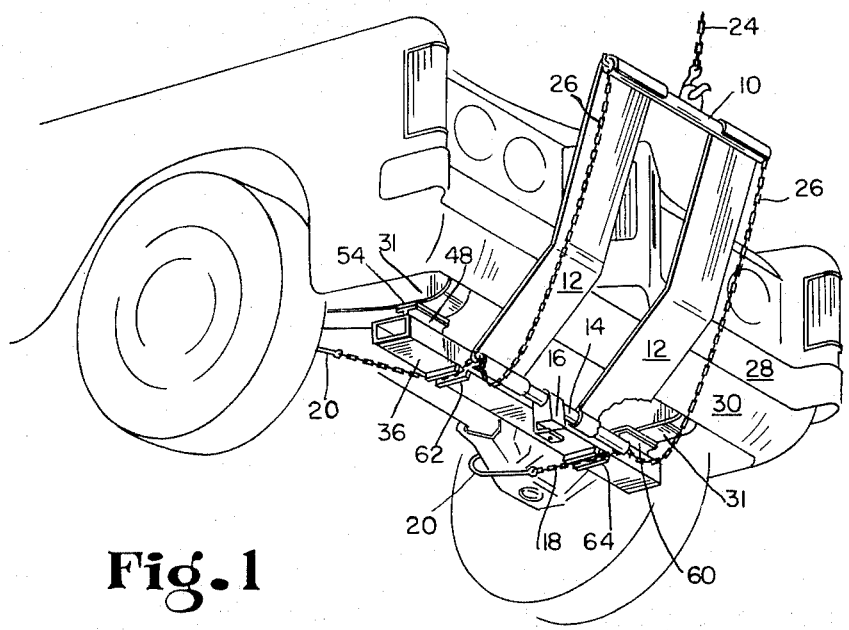
FIG. 1 is a fragmentary perspective of the front end of an automobile lifted for towing with our appliance in operative position.

Referring more particularly to FIG. 1 of the drawings, it will be seen that we have illustrated a lifter bar 10 which is connected, by two broad, flexible straps 12, to an anchor bar 14 which is preferably provided at the midpoint of its length with a swivel fitting 16 for attachment to an extensible bar 22 (FIG. 3) on a tow truck. Towing chains 18, 18 are connected to opposite ends of the anchor bar and are provided at their free ends with hooks 20 which may be engaged at suitable points to the vehicle chassis. As shown, the hooks are engaged with the lower suspension bars for the vehicle front wheels.

A lifter chain 24, which is a part of the derrick equipment of a conventional tow truck, is suitably engaged with the lifter bar 10 at the midpoint of its length.

It will be seen that, when the anchor bar 14 is tucked under the front end of a vehicle to be towed and the hooks 20 are suitably engaged, and when lifting force is applied to the chain 24, the straps 12, 12 will wrap about the bumper 28 to lift the front wheels of the vehicle, whereafter the vehicle may be towed behind the tow truck. Ideally, the straps will not engage the panel 30, because that panel in many vehicles is not designed to withstand stresses of the type which might be applied thereto by the bands 12; but it will be appreciated that if the anchor bar 14 is allowed to come too close to the vehicle frame members 31, the straps may so engage the panel member 30.

Slack chains 26, 26 connect the lifter bar 10 with the anchor bar 14 merely as a safety measure, in case one of the straps 12 should break or stretch unduly.

Figure 2:
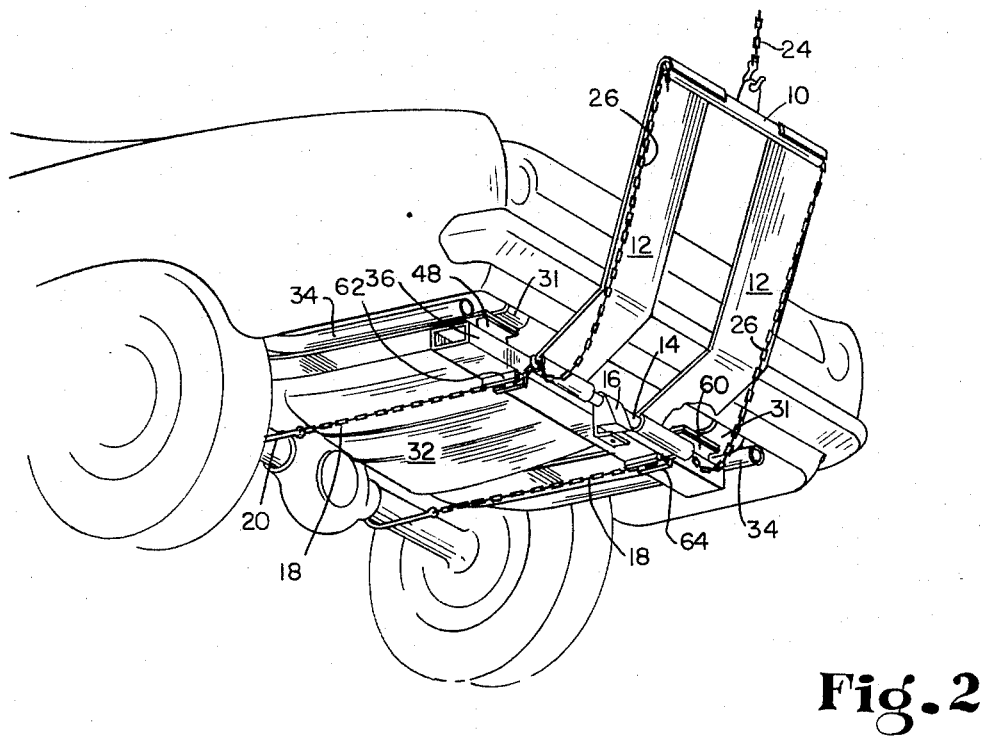
FIG. 2 is a similar view of the rear end of an automobile so lifted.

Referring to FIG. 2, it will be noted that the fuel tank 32 and the tailpipes 34, 34 of the vehicle extend below the frame members 31 and might well be engaged and damaged by the chains 18 or by any element spanning the chains 18.

To ensure such a location of the parts of the sling lift above described as to avoid damage to relatively fragile parts of the vehicle, we provide the appliance illustrated in detail in FIGS. 4 and 5.

A sturdy cross beam 36 which may of any desired construction provides on its upper surface a longitudinal trackway 38. The beam 36 may be solid, or it may be tubular as shown, but its upper surface will be substantially flat. The trackway 38 may be of any desired form; but we have shown it as fabricated from parallel, longitudinal battens 40, 40 carrying inturned slats 42, 42 and running the full length of the beam. Preferably, stops 44 and 46 are permanently located at opposite ends of the trackway. The beam will be of sufficient length more than to span the distance between frame members 31 of the widest vehicles to be encountered.

A post 48 is slidably mounted in the trackway 38 near one end of the beam 36. As shown, the post 48 comprises an I-bar section whose lower flanges 50 are entrapped beneath the slats 42 whereby said post is guided for adjustment longitudinally of the beam 36. The upper flanges of the I-bar section thus constitute a table 52; and preferably a rubberoid pad 54 is secured coincidently to cover said table. We have shown four headed screws 56 taking through the pad 54 and through bores in the table 52 to receive nuts 58 below the table, the screw heads being countersunk below the upper surface of the pad 54; but it will be obvious that other expedients may be used for securing the pad in place on the table.

A second post 60, identical in all respects with the post 48, is similarly mounted in the trackway 38 near the opposite end of the beam 36.

Guideways 62, 64 extending transversely of the beam 36 open downwardly from the lower surface of said beam for receiving, respectively, the chains 18, 18 to maintain separation between said chains and to retain said beam against transverse movement relative to the vehicle once the beam has been located.

From the above description it will be apparent that after the hooks 20, 20 have been attached and before any lifting force has been applied to the sling through the chain 24, the posts 48 and 60 may be adjusted along the beam 36 so that they may be threaded between other depending parts of the vehicle to move into engagement, respectively, with the opposite frame members 31. Now, the bar 10 may be lifted to enter the chains 18, 18 into the guideways 62, 64 and to lift the beam 36 to press the pads 54, 54 against the respective frame elements.

In this position, the separated posts 48 and 60 have been moved past any depending parts to supporting relation with the vehicle frame members, while the beam 36 itself is held below the level of any relatively fragile parts and the beam in turn holds the chains 18, 18 below the level of any such parts. Still further, the anchor bar 14 is held at a low enough level so that, when vehicle-lifting force is applied to the sling, the straps 12 will completely clear any vehicle parts below the bumper 28 and the angle of inclination of the straps 12 will be such that the horizontal component of the lifting force applied to the straps will be minimal, thus avoiding damage even to the bumper 28 or its supporting structure.

A modified form of appliance is illustrated in FIG. 6 wherein the beam 66 is formed of malleable metal rolled to define inturned edges 68 and 70 to perform the function of the battens 40 and slats 42. In this form of the invention, stop tabs 72 and 74 are turned upwardly at opposite ends of the web of the beam to prevent complete removal of the posts 48 and 60 whose lower flanges are entrapped and guided beneath the rolled edges 68 and 70 of the beam. Guideways 76 and 78, equivalent in structure and function to the guideways 62 and 64, are provided on the lower surface of the beam 66.

We Claim as Our Invention:

1. An appliance for use in sling-towing a vehicle formed to provide a pair of laterally-spaced, downwardly-facing frame members adjacent an end of the vehicle with relatively fragile depending parts in proximity with said frame members, by means of a sling comprising a lifter bar, an anchor bar connected to said lifter bar by flexible strap means and hook means connected to said anchor bar by flexible strand means, said hook means being engaged with the vehicle chassis, said appliance comprising cross beam means spanning said frame members, two upstanding posts longitudinally spaced from each other on the upper surface of said beam means and engageable respectively with the downwardly-facing surfaces of said frame members to support said vehicle end and space said beam means below said relatively fragile parts, said beam means being interposed between said strand means and said relatively fragile parts, and cooperating means mounting at least one of said posts for independent adjustment longitudinally on said beam means.

2. The appliance of claim 1 in which said beam means provides longitudinal trackway means along its upper surface and said posts are guided by said trackway means for independent movement along said trackway means.

3. The appliance of claim 1 including longitudinally-spaced, transversely-extending guide means on the lower surface of said beam means for cooperative reception of said strand means.

4. The appliance of claim 2 in which each post carries an upwardly-facing rubberoid pad.

5. A towing device for a vehicle having laterally spaced apart downwardly facing frame members adjacent an end of the vehicle, said device comprising, in combination, an anchor bar having a center portion and opposite end portions, means for lifting said anchor bar, a pair of hooks for engaging laterally spaced apart portions of the underside of such a vehicle, strand means for connecting said hooks respectively to said opposite end portions, and cross beam means interposed between said strand means and the vehicle to rest on said strand means, said cross beam means providing two upstanding posts longitudinally spaced from each other for engaging respectively such frame members and two longitudinally spaced guideways engaging respectively said strand means, the distance between said posts being adjustable along the cross beam means, and cooperating means on the cross beam means and posts providing said adjustment.

* * * * *